(No Model.)

L. KELLER.
ROPE OR CLOTHES LINE TIE.

No. 581,592. Patented Apr. 27, 1897.

WITNESSES:
Edward Thorpe
Geo. Foster

INVENTOR
L. Keller.
BY
ATTORNEYS.

UNITED STATES PATENT OFFICE.

LOUIS KELLER, OF BROOKLYN, NEW YORK.

ROPE OR CLOTHES-LINE TIE.

SPECIFICATION forming part of Letters Patent No. 581,592, dated April 27, 1897.

Application filed December 30, 1896. Serial No. 617,501. (No model.)

*To all whom it may concern:*

Be it known that I, LOUIS KELLER, of Brooklyn, in the county of Kings and State of New York, have invented a new and Improved Rope or Clothes-Line Tie, of which the following is a full, clear, and exact description.

The object of the invention is to provide a new and improved rope, cable, or clothes-line tie which is simple and durable in construction, very effective in operation, and arranged to permit of conveniently fastening the loose end of the rope, cable, or clothes-line in place or automatically releasing the same whenever desired.

The invention consists principally of a casing having means for attaching one end of a rope and a guide for the other or loose end, a horn pivoted on the said casing and adapted to receive and hold the loop formed by the loose end of the rope, and a locking and releasing device for the said horn for holding it in a locked position on the casing or releasing it to throw off the loop.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
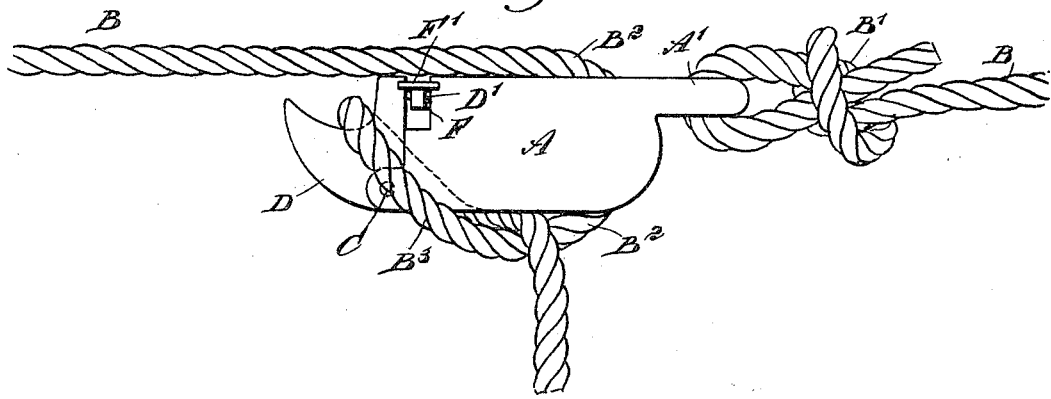
Figure 2:
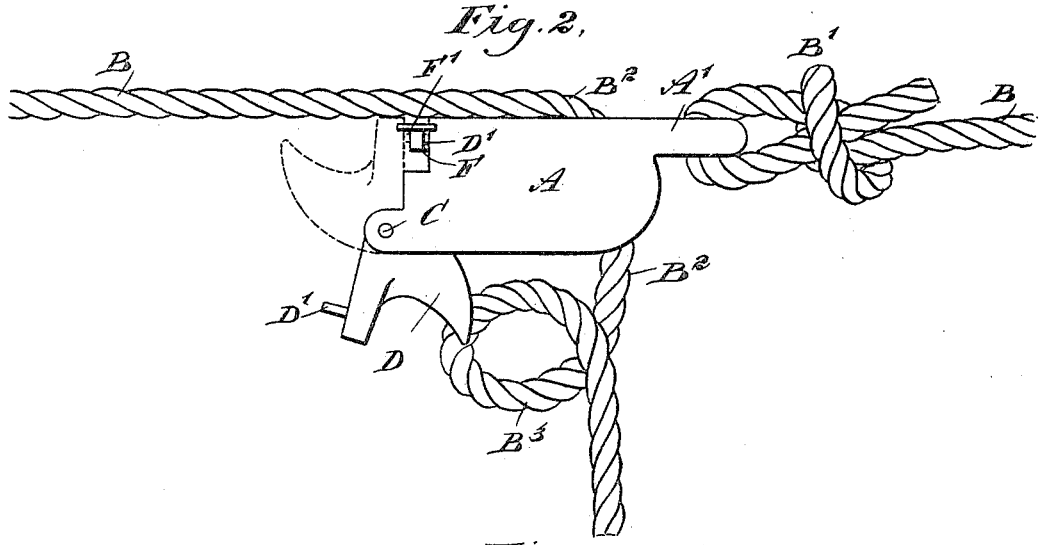
Figure 3:
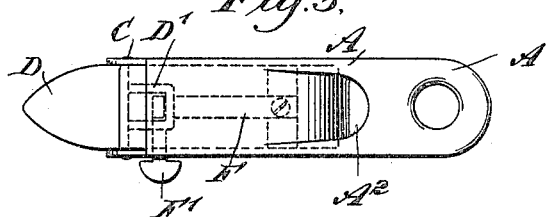
Figure 4:
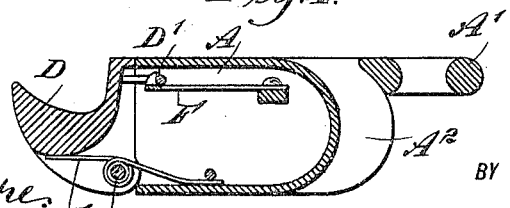

Figure 1 is a side elevation of the improvement with the rope held in place at both ends. Fig. 2 is a similar view of the same with the loop thrown off the horn. Fig. 3 is a plan view of the improvement, and Fig. 4 is a sectional side elevation of the same.

The improved tie is provided with a casing A, formed at one end with an eye A', in which is secured the end B' of a rope, cable, or clothes-line B, having its other end B² passed through a semicircular guideway A², formed on the body A of the casing.

On the forward end of the casing A and near the bottom thereof is arranged a transversely-extending pivot C, on which is hung a horn D, adapted to receive a loop B³, formed on the loose end B² of the rope, cable, or clothes-line B. The horn D is normally held in a closed position, as shown in Figs. 1, 3, and 4, by means of a spring E, secured in the casing A and passing around the pivot C. The horn D is provided on its base with a staple D', adapted to be engaged by a catch F, held within the casing A, as is plainly indicated in Fig. 4, the said catch being provided with a transversely-extending arm F', reaching to the outside of the casing, to be under the control of the operator. Now it will be seen that by the arrangement described the horn D is normally held in a closed and locked position by the action of the spring E and by the staple D' engaging the spring-catch F. When the horn is in this position, the loop B³, formed on the end B² of the rope, is passed around the horn, as shown in Fig. 1, so that a strain on the rope draws the loop very tight, and consequently fastens the loose end in place on the horn and casing.

When it is desired to suddenly release the loose end of the rope by giving the desired slack to the same or to entirely disconnect the loose end from the casing A, then the operator presses on the handle F' to disconnect the spring-catch F from the staple D'. A pull on the rope draws on the horn D, and as the latter is unlocked the horn swings open in a downward direction, as indicated in Fig. 2, so that the loop finally slips off the horn and the latter immediately returns to a closed or locked position by the action of the spring E.

It will be seen that by the arrangement described the loose end of the rope can be quickly and conveniently fastened on the casing or released therefrom, as may be desired.

By the arrangement described the line, rope, or cable is not liable to be injured by coming in contact with sharp edges and the like, and hence the life of the rope will be prolonged, and the rope is not liable to break when loaded, to the injury of the contents hung on the line.

Having thus fully described my invention, I claim as new and desire to secure by Letters Patent—

1. In a rope or clothes-line tie, the combination with the casing, of a horn pivotally connected with said casing and around which the loose end of the rope is looped and held, a device by which said horn is held in locked position and released to swing open to throw off the loop, and means for returning said horn to locked position, as and for the purpose set forth.

2. In a rope or clothes-line tie, the combination with the casing having means for attaching one end of a rope and a guide for the other or loose end of the rope, of a horn pivotally connected with said casing and arranged to receive and hold a loop formed by the loose end of the rope, a spring-catch in said casing and by which said horn is held in closed position and released to swing open to throw off the loop, and a spring for returning said horn to closed and locked position, as and for the purpose set forth.

3. In a rope or clothes-line tie, the combination with the casing having means for attaching one end of a rope and a guide for the other or loose end of the rope, of a horn pivotally connected with said casing, a spring in the bottom of said casing and normally holding said horn in an upper or closed position for receiving a loop formed by the loose end of said rope, and a spring-catch by which said horn is locked in its upper position and arranged to permit said horn to swing down and release or throw off said loop, as and for the purpose set forth.

LOUIS KELLER.

Witnesses:
 THEO. G. HOSTER,
 HENRY FREY.